Dec. 11, 1945.  H. E. IVES  2,390,652
OPTICAL RANGE FINDER
Filed Nov. 25, 1943  2 Sheets-Sheet 1

INVENTOR
H. E. IVES
BY
Stanley B. Kent
ATTORNEY

Dec. 11, 1945.  H. E. IVES  2,390,652
OPTICAL RANGE FINDER
Filed Nov. 25, 1943   2 Sheets-Sheet 2

INVENTOR
H. E. IVES
BY
Stanley B. Kent
ATTORNEY

Patented Dec. 11, 1945

2,390,652

UNITED STATES PATENT OFFICE 2,390,652

OPTICAL RANGE FINDER

Herbert E. Ives, Montclair, N. J., assignor to Bell Telephone Laboratories, Incorporated, New York, N. Y., a corporation of New York Application November 25, 1943, Serial No. 511,664

12 Claims. (Cl. 88—2.7)

This invention relates to range finders.

An object of the invention is to provide improved means in a range finder for determining the proper range setting for an object by causing two fusible visual representations of an object field including said object to flicker at the same rate and in opposite phase, the proper setting being indicated by the absence of flicker of the object being ranged.

In an example of practice of the invention, shutter means are provided in an overlapping image type of range finder to intermittently and alternately eliminate the respective images from the view of the observer at a frequency to produce observable flicker in each image if the other image were eliminated continuously during observation. In this type of range finder, optical means produce two images of the same object field from separated points of view in the focal plane of a single ocular. The two images are relatively adjustable to effect coincidence in any part of the image field. In normal operation neither image is eliminated continuously but as one fades out the other fades in so that the images of objects which are in exact coincidence do not flicker. Correct setting is indicated when the observed image of the target or object being ranged ceases to flicker. The target may be located anywhere within the field of view.

In one typical arrangement, the shutter means comprises three sheets of light polarizing material, one well-known type of such material being known as "Polaroid." Two of these sheets are placed in the respective light beams of the image forming light means or telescopes somewhere between the object field and the common portion of the light paths. These sheets are so oriented that the light beams forming the respective images are polarized at right angles to one another at the plane of the overlapping images. The third sheet of polarizing material which serves as an analyzer, is located in the common path where the respective beams are polarized at right angles to each other and arranged to be rotated in the plane of the sheet about an axis perpendicular to the sheet and parallel and close to the optical axis of the common path. As the analyzer sheet is rotated, each image fades out and fades in as the polarizing axis of this sheet passes from parallelism with the plane of vibration of the image forming beam through an angle of ninety degrees therewith and back into parallelism. Since the two image forming beams are polarized at right angles to one another, one image fades out as the other fades in. The speed of rotation of the analyzer sheet is such as to cause each image to appear to flicker. However, such portions of the two images as are in exact coincidence appear as a single image and without flicker.

In another typical arrangement, rotating slotted shutters are arranged to interrupt intermittently the respective light beams of the two telescopes. The shutters may be placed anywhere in the separated light paths, one convenient place being at the respective entrance apertures of the combining optical means. These shutters are arranged to stop one beam as the other is unstopped so that one image fades out as the other fades in at the desired flicker rate to make possible easy adjustment for coincidence in any portion of the image field.

The use of flicker to facilitate the proper setting of a range finder is applicable to all types of range finders which rely upon fusion of the observed images of the object field whether the observing of such fusion requires only one or both eyes of the observer. Flicker producing means may be used with any type of stereoscopic range finder as well as with coincidence types of range finders.

This invention will now be described more in detail having reference to the accompanying drawings.

The same reference characters are used to indicate identical elements of the several figures of the drawings.

Figure 1:
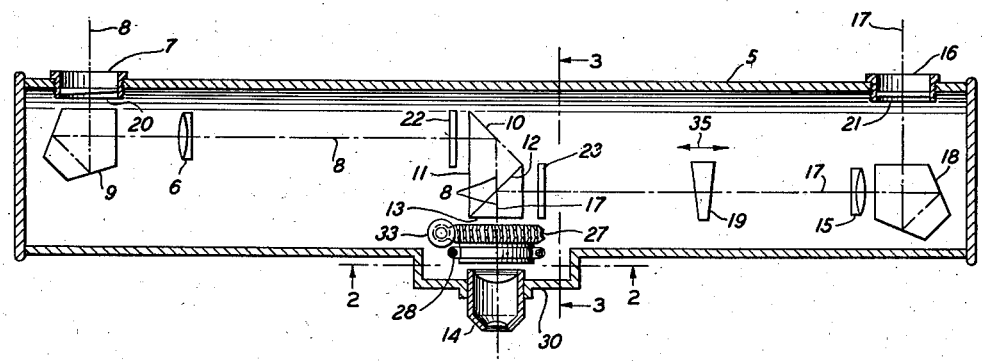
Fig. 1 is a diagrammatic plan view partially in section of an optical range finder according to this invention comprising light polarizing shutters.

Referring now to Fig. 1, a generally tubular hollow casing 5 is adapted to support the optical elements of a coincidence range finder. In such a range finder, two images from separated points of view are formed by optical means in the focal plane of a single ocular. In the arrangement of Fig. 1, the image from the left-hand point of view is formed by objective lens 6 utilizing light entering through window 7. The axis of this beam of light is represented by dot-and-dash line 8, the direction of which is changed at a right angle by the optical square 9 and again at a right angle by the internally fully reflecting face 10 of prism 11, such axis passing out of prism 10 and through the semi-reflecting face 12 of prism 13 to the focal plane of ocular 14. The image from the right-hand point of view is formed by objective lens 15 utilizing light entering through window 16. The axis of the beam of light from the window 16 is represented by dot-and-dash line 17, the direction of which is changed at a right angle by an optical square 18 and again at a right angle by the semi-reflecting face 12 of prism 13 to coincide with the left-hand axis represented by line 8. The objective lenses 6 and 15 are so located as to form images of the object field of equal size in the focal plane of the ocular 14. The ocular 14 may be of any well-known type. By means of prism 19 which is movable along the axis 17, as indicated by the double headed arrow 35, the image formed by the objective lens 15 may be moved transversely in the focal plane of ocular 14. By means of an adjustable prism 20 in the window 7, the image formed by objective lens 6 may be moved both vertically and transversely to effect an infinity setting, that is, to effect coincidence of the two overlapping images in the focal plane of the ocular 14 when viewing an object effectively located at infinity and with the prism 19 set at its infinity position which is toward the middle of the casing 5. The use of prisms such as 19 and 20 are well known in the prior art. The window 16 is closed by a plane glass plate 21.

According to this invention, a sheet 22 of "Polaroid" is placed at the entrance face of prism 11 and another sheet 23 of the same kind is placed at the entrance face of prism 13. These sheets have their polarizing axes oriented at right angles to one another so that the respective light beams forming the two images in focal plane of the ocular 14 are polarized in planes at right angles to one another. The polarizing axis of a sheet is the line of intersection of the plane of vibration of the polarized beam with a plane surface of the sheet. As shown in Fig. 3 the polarizing axis of sheet 22 is horizontal as represented by the double-headed arrow 24 and the polarizing axis of sheet 23 is vertical as represented by the double-headed arrow 25. A third sheet 26 of "Polaroid" is mounted for rotation in the plane of the sheet about an axis which is parallel to and may coincide with the axes 8 and 17 of the left-hand and right-hand beams, respectively, where these two beams traverse a common path. The location of sheet 26 is near the focal plane of the ocular 14. The sheet 26 is mounted inside a hollow spiral gear 27, which gear is supported for rotation in a ring bearing 28 mounted on a pedestal 29 secured to the offset portion 30 of casing 5. The gear 27 is driven by a motor 31 through shaft 32 and spiral pinion 33. The motor 31 is mounted on the lower side member of offset portion 30, the shaft 32 passing through a light-tight opening in this side member. The polarizing axis of sheet 26 in the position shown in Fig. 2 is vertical as represented by the double-headed arrow 34.

Figure 2:
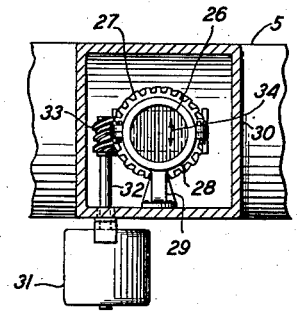
Fig. 2 is a partial vertical cross-section of Fig. 1 along the line 2—2 looking in the direction of the arrows.
Figure 3:
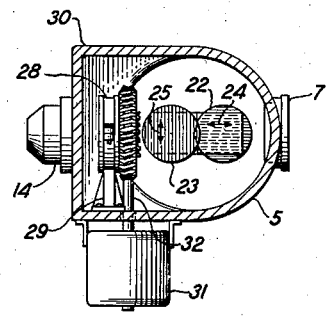
Fig. 3 is a cross-section of Fig. 1 along the line 3—3.

With the polarizing sheet 26 in the position shown in Fig. 2, the image formed by light entering the right-hand window 16 which is polarized by sheet 23 is visible at maximum brilliance because the polarizing axes of sheets 23 and 26 are parallel, that is, the plane of vibration of the light which has passed through sheet 23 as it arrives at sheet 26 is parallel to the polarizing axis of sheet 26. As the sheet 26 is rotated by the motor 31, it assumes a position such that the polarizing axis is horizontal and the image formed by light entering the left-hand window 7 which is polarized by sheet 22 is visible at maximum brilliance since the plane of vibration of the light which has passed through sheet 22 as it arrives at sheet 26 is horizontal and therefore parallel to the horizontal polarizing axis of sheet 26. For the sake of brevity, the image formed by light entering the right-hand window 16 will be called the right-hand image, and the image formed by light entering the left-hand window 7 will be called the left-hand image. As the sheet 7 rotates from the position shown in Fig. 2 through ninety degrees, the right-hand image will fade out as the left-hand image fades in. When the right-hand image is at maximum brilliance, the left-hand image is at minimum brilliance. For each complete revolution of the sheet 26, each image assumes maximum brilliance two times and minimum brilliance two times. Good results have been obtained with the sheet 26 rotating at the rate of five revolutions per second, giving a flicker rate for each image of ten per second.

In use, the casing 5 would be mounted on a suitable support so that the range finder could be directed to any desired object field. The instrument would have been calibrated so that the position of the prism 19 would indicate the range when the right-hand and left-hand images of the target are in coincidence. With the motor 31 running at a suitable rate, coincidence of the target images is indicated when the target image appears not to flicker, that is, when the two images supplement one another so as to give the appearance of a single image of constant brilliance.

Practically all observers are able to set the range more accurately with an instrument using this flicker feature than with instruments not utilizing flicker. Since accuracy has assumed great importance with rapidly moving targets such as airplanes, the increased accuracy of applicant's range finder justifies the added complication of providing a rotating shutter.

Figure 4:
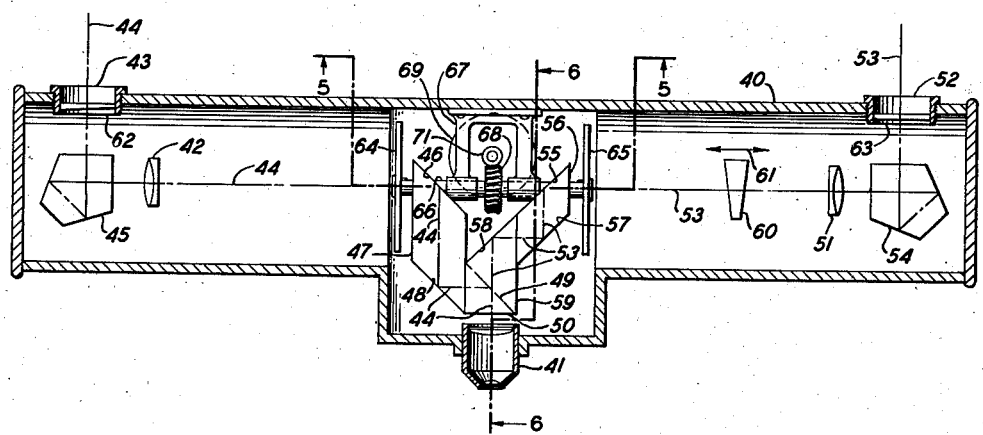
Fig. 4 is a diagrammatic plan view partially in cross-section of a modified optical range finder according to this invention comprising slotted rotating disc shutters.
Figure 5A:
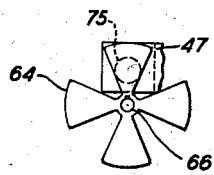
Figs. 5A and 5B show the relative angular positions of the shutters of Fig. 5.
Figure 5:
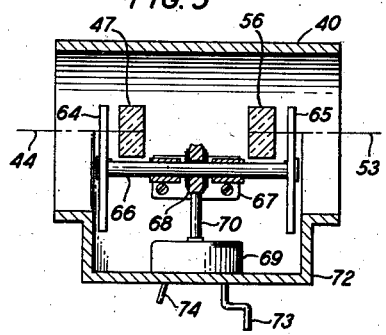
Fig. 5 is a partial vertical cross-section of Fig. 4 along the line 5—5.
Figure 6:
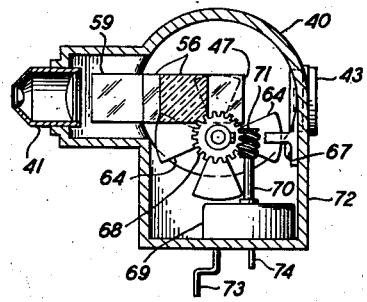
Fig. 6 is a cross-section of Fig. 4 along the line 6—6.

A modified form of range finder according to this invention comprising a slotted rotating disc shutter is illustrated in Figs. 4 to 6. This modified range finder comprises a generally tubular hollow casing 40 adapted to support the optical elements of a coincidence range finder. The left-hand image is formed in the focal plane of the ocular 41 by objective lens 42 utilizing light entering through window 43. The axis of this beam of light is represented by dot-and-dash line 44, the direction of which is changed at right angles four times; first by the optical square 45, second by the internally reflecting face 46 of trapezoidal prism 47, third by the other internally reflecting face 48 of prism 47, and fourth by the semi-reflecting face 49 of right triangular prism 50. The right-hand image is formed also in the focal plane of ocular 41 by objective lens 51 utilizing light entering through window 52. The axis of this beam is represented by dot-and-dash line 53, the direction of which is changed at right angles also four times; first by the optical square 54, second by the internally reflecting face 55 of trapezoidal prism 56, third by internally reflecting face 57 of prism 56, and fourth by the internally reflecting face 58 of isosceles triangular prism 59. This axis then pases through the semi-reflecting face 49 of prism 50. By means of prism 60 which is movable along the axis 53, as indicated by the double-headed arrow 61, the right-hand image formed by objective lens 51 may be moved transversely in the focal plane of ocular 41. By means of adjustable prism 62 in the window 43, the left-hand image formed by objective lens 42 may be moved both vertically and transversely to effect an infinity setting. The window 52 is closed by a plane glass plate 63.

Figure 5B:
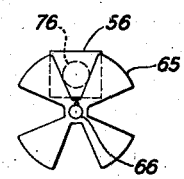

A pair of slotted disc shutters 64 and 65 are adapted to intermittently stop the left-hand and right-hand image forming light beams, respectively. Shutters 64 and 65 are secured to the opposite ends of a shaft 66 which is adapted to rotate in bearings of support 67. Secured to the shaft 66 is a spiral gear 68. Gear 68 is rotated by spring-driven clock-work motor 69 through shaft 70 and spiral pinion 71 which meshes with gear 68. Motor 69 is secured to an offset portion 72 of casing 40. The spring of motor 69 is wound by a crank 73 which extends through a light-tight opening in the offset portion 72. A lever 74 which also extends from motor 69 through a light-tight opening in offset portion 72 is provided for starting and stopping the motor 69. The relative angular position of the shutters 64 and 65 on the shaft 66 are shown by Figs. 5A and 5B which are views of the disc shutters looking toward the respective adjacent ends of Fig. 5. Dotted circles 75 and 76 show the sizes of the left-hand and right-hand image forming beams respectively at the planes of the shutters 64 and 65. As the shutters rotate, each beam is stopped as the other beam is unstopped, the slots and vanes, being of equal sizes. In order to produce a flicker rate of about ten cycles per second, a desirable rate as has been pointed out hereinbefore, the shutters with four vanes will be rotated at the rate of two and one-half revolutions per second or 150 R. P. M. (revolutions per minute). Casing 40 in use would also be suitably mounted so that it could be readily directed to the object field.

The operation of the rotating shutter form of flicker range finder is essentially the same as that of the polarized light form. In both forms of range finders the shutters operate to blackout the images intermittently and alternately.

The spring-driven, clock-work motor may be used to rotate the sheet of polarizing material in the polarized light form of range finder and obviates the necessity for a source of electrical power. An electric motor also may be used to drive the rotating slotted disc shutters. The ideal locations for the rotating disc shutters are near the objective lenses 42 and 51, but such location involves difficulties in mounting and driving these shutters in accurate synchronism. The shutters may also be located in front of the windows 52 and 43. For best results, the shutters should be so arranged that the left-hand image fades out at the same rate that the right-hand image fades in and vice versa, but some departure from this ideal condition is permissible without seriously affecting the accuracy of setting the range indicator.

An optical square is a prism of transparent material such as glass so shaped that a beam of light entering one face is twice reflected at internal faces and emerges in a direction at right angles to the direction of its entrance. The angle between the reflecting faces is 45 degrees. The optical squares 9, 18, 45 and 54 mentioned hereinbefore are such prisms. Their use in range finders is well known in the prior art.

The optical elements shown diagrammatically in the drawings will, of course, be suitably supported within the casings.

Other modified forms of range finders will be obvious to those skilled in this art from the foregoing description and such modifications come within the purview of this invention as defined in the appended claims.

What is claimed is:

1. A range finder comprising means to produce overlapping images of a target area from separated points of view, means to eliminate said images intermittently and alternately at a frequency to produce observable flicker in each image if viewed by itself, and means to adjust said images transversely relatively to each other whereby coincidence of the images of a selected target may be effected as indicated by the absence of flicker in such target images.

2. A range finder comprising two telescopes separated transversely with respect to their entrance windows and adapted to be directed toward the same target area, optical image combining means whereby images of the target area formed by said telescopes may be viewed as overlapping images, shutter means in the paths of the image forming light rays of said telescopes to eliminate said images from the view of an observer intermittently and alternately at a frequency to produce observable flicker in each image.

3. A range finder comprising means to produce intermittently and alternately images of the target area from separated points of view in positions such that said images are overlapping when produced simultaneously, said images being produced at a frequency to produce observable flicker in each image if viewed by itself, and means to adjust said images transversely relatively to each other whereby coincidence of the images of the selected target may be effected as indicated by the absence of flicker in such target image.

4. A range finder comprising means to produce two views of an object field which are visible to an observer, means to cause said views to appear to coincide at least in part, and means to fade out one of said views from and simultaneously fade in the other of said views to the observer alternately and cyclically at a frequency to produce observable flicker in each view if the other view were continuously obscured.

5. A range finder comprising a light excluding hollow casing having two windows separated from each other an appreciable distance, an ocular mounted in another opening in said casing, optical means including objective lenses individual to each of said windows and beam combining means to form in the focal plane of said ocular overlapping images of an object field by light entering said windows, means to polarize the light forming each of said images before the image forming light rays are directed in a common path, the plane of polarization of the light forming one image being at right angles to the plane of polarization of the light forming the other image in a plane intersecting the common path, and an analyzer for polarized light located transversely of the common path between the observer's eye and the combining means and rotated at a rate to produce observable flicker in the portions of the two images which are not in coincidence.

6. A range finder comprising a light excluding hollow casing having two windows separated from each other an appreciable distance, an ocular mounted in another opening in said casing, optical means including objective lenses individual to each of said windows and beam combining means to form in the focal plane of said ocular overlapping images of an object field by light entering said windows, sheets of light plane polarizing material intersecting said image forming light beams between said objective lenses respectively and said beam combining means, the polarizing axes of said sheets being at right angles to each other, an analyzing sheet of light plane polarizing material intersecting said common path and rotatable in its own plane about an axis perpendicular to its own plane and substantially parallel to the axis of said common path, and means to rotate said analyzing sheet at a rate to produce observable flicker in portions of said two images which are not in coincidence.

7. A range finder comprising a light excluding hollow casing having two windows separated from each other an appreciable distance, an ocular mounted in another opening in said casing, optical means including objective lenses individual to each of said windows and beam combining means to form in the focal plane of said ocular overlapping images of an object field by light entering said windows, rotatable disc shutters mounted between said objective lenses respectively and said beam combining means to intermittently stop said respective image forming light beams, one of said beams being stopped while said other beam is being unstopped, and means to rotate said shutters at a rate to cause each of said images to appear to the observer to flicker.

8. A range finder comprising a light excluding hollow casing having two windows separated from each other an appreciable distance, an ocular mounted in another opening in said casing, optical means including objective lenses individual to each of said windows and beam combining means to form in the focal plane of said ocular overlapping images of an object field by light entering said windows, rotatable disc shutters mounted between said objective lenses respectively and said beam combining means to intermittently stop said respective image forming light beams, and means to rotate said shutters to cause one of said images to fade out at the same time and rate as the other fades in and vice versa, said rate being such as to make each of said images appear to the observer to flicker.

9. A range finder comprising means to make visible to an observer images of the same object field from points of view separated by a distance substantially greater than the distance between the pupils of the eyes of the observer including means to make the images of a selected object in said object field appear to coincide, and means to fade out one of said images and fade in said other at substantially the same time and rate and vice versa, the start of a fade out occurring at substantially the same instant as the start of a corresponding fade in.

10. A range finder comprising means to make visible to an observer images of the same object field from points of view separated by a distance substantially greater than the distance between the pupils of the eyes of the observer including means to make the images of a selected object in said object field appear to coincide, and means comprising polarizing and analyzing elements to fade out one of said images and fade in said other at substantially the same time and rate and vice versa, the start of a fade out occurring at substantially the same instant as the start of a corresponding fade in.

11. A range finder comprising means to make visible to an observer images of the same object field from points of view separated by a distance substantially greater than the distance between the pupils of the eyes of the observer including means to make the images of a selected object in said object field appear to coincide, means comprising polarizing and analyzing elements the polarizing axes of which are angularly displaceable relatively to each other, and means to displace said elements to fade out one of said images and fade in said other simultaneously at substantially the same rate and vice versa.

12. A range finder comprising means to view images of a target area produced from separated points of view and appearing as overlapping images to the observer, means to fade out one of said images from and simultaneously fade in another of said images to the view of the observer alternately and cyclically at a frequency to produce observable flicker in each image if viewed by itself, and means to adjust said images relatively to each other to substantially eliminate or noticeably reduce the flicker of the observed image of a selected target, the position of the adjusting means indicating the range of the selected target.

HERBERT E. IVES.